United States Patent
Yu et al.

(10) Patent No.: US 9,432,818 B2
(45) Date of Patent: Aug. 30, 2016

(54) CONTROLLING COMMUNICATION DEVICES

(75) Inventors: Ling Yu, Oulu (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 685 days.

(21) Appl. No.: 13/578,405

(22) PCT Filed: Feb. 11, 2010

(86) PCT No.: PCT/EP2010/051716
§ 371 (c)(1),
(2), (4) Date: Aug. 27, 2012

(87) PCT Pub. No.: WO2011/098128
PCT Pub. Date: Aug. 18, 2011

(65) Prior Publication Data
US 2012/0322484 A1 Dec. 20, 2012

(51) Int. Cl.
| | |
|---|---|
| H04B 5/00 | (2006.01) |
| H04W 4/08 | (2009.01) |
| H04W 8/18 | (2009.01) |
| H04W 72/04 | (2009.01) |
| H04W 76/02 | (2009.01) |
| H04W 84/04 | (2009.01) |
| H04W 84/18 | (2009.01) |
| H04W 4/00 | (2009.01) |

(52) U.S. Cl.
CPC ............. *H04W 4/08* (2013.01); *H04W 8/186* (2013.01); *H04W 4/005* (2013.01); *H04W 72/042* (2013.01); *H04W 76/023* (2013.01); *H04W 84/042* (2013.01); *H04W 84/18* (2013.01)

(58) Field of Classification Search
CPC . H04W 84/18; H04W 84/045; H04W 88/06; H04W 48/08; H04W 84/12; H04W 88/02; H04W 12/06
USPC .......................................... 455/41.1
See application file for complete search history.

(56) References Cited

U.S. PATENT DOCUMENTS

| | | | | |
|---|---|---|---|---|
| 5,040,238 A | * | 8/1991 | Comroe | H04W 84/08 455/520 |
| 2006/0183423 A1 | * | 8/2006 | Johansson | H04L 12/24 455/41.2 |
| 2007/0274271 A1 | * | 11/2007 | Jones | H04W 8/005 370/338 |
| 2009/0016363 A1 | | 1/2009 | Laroia et al. | 370/401 |
| 2009/0017807 A1 | * | 1/2009 | Kwon | H04W 76/021 455/416 |

FOREIGN PATENT DOCUMENTS

| | | |
|---|---|---|
| EP | 1 988 724 A1 | 11/2008 |
| WO | WO 2007/055993 A1 | 5/2007 |
| WO | WO 2009/014278 | 1/2009 |

* cited by examiner

*Primary Examiner* — Ajibola Akinyemi
(74) *Attorney, Agent, or Firm* — Harrington & Smith

(57) ABSTRACT

A method and control apparatus for a wireless communication system is disclosed for providing grouping of sets of paired communication devices into groups of paired communication devices at least in part based on information about other paired communication devices. The information is determined based on detection by at least one of the communication devices in a relevant set of paired communication devices.

32 Claims, 6 Drawing Sheets

CONTROLLING COMMUNICATION DEVICES

The invention relates to control of communication devices, and more particularly to grouping of communication devices in a communication system.

A communication system can be seen as a facility that enables communication sessions between two or more entities such as user terminals, base stations and/or other nodes. A communication system can be provided for example by means of a communication network and one or more compatible communication devices or by means of a plurality of mobile communication devices. The communications can comprise, for example, carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), ad-hoc networks, satellite based communication systems and different wireless local networks, for example wireless local area networks (WLAN). The wireless systems can be divided into cells, such systems being often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network and/or communications directly with other users. A communication device may communicate simultaneously with more than one other station.

The communication system and associated devices typically operate in accordance with a given standard or specification which sets out what the various entities associated with the system are permitted to do, how that should be achieved and how resources are allocated. A non-limiting example of standards that aim to solve problems associated with the increased demands for capacity is an architecture known as the long-term evolution (LTE) of the Universal Mobile Telecommunications System (UMTS) radio-access technology. The LTE is being standardized by the $3^{rd}$ Generation Partnership Project (3GPP). The aim of the standardization is to achieve a communication system with, inter alia, reduced latency, higher user data rates, improved system capacity and coverage, and reduced cost for the operator. A further development of the LTE is referred to as LTE-Advanced (LTE-A). The LTE-Advanced aims to provide further enhanced services by means of even higher data rates and lower latency with reduced cost.

Some cellular systems enable direct communication links between the communication devices. In such systems a central control apparatus, for example a base station such as an enhanced NodeB of the LTE, can be made responsible for providing control on the direct communications between communication devices in its service area. Thus, in addition of controlling allocation of radio resources to users of the cellular services the control apparatus can also control resource allocation for communication devices that are in direct communications with each other. Communication devices communicating directly via wireless connections can cause interference to other devices in the area. Thus a mechanism to control this centrally might be desired. However, central control of distributed communication devices may require collecting, maintaining and communicating considerable amounts of information. This can cause considerable signalling overhead.

It is noted that the issues in view of the overhead and/or interference are not limited to any particular communication environment, but may occur in any appropriate communication system where direct wireless links between communication devices may be provided.

Embodiments of the invention aim to address one or several of the above issues.

In accordance with an embodiment there is provided a method for a wireless communication system comprising grouping a set of paired communication devices into a group of paired communication devices at least in part based on information about other paired communication devices, the information being determined based on detection by at least one of the communication devices in the set of paired communication devices, and controlling wireless communications based on the grouping.

In accordance with another embodiment there is provided a method for initiating forming of a set of paired communication devices, the set including a communication device and at least one other communication device, the method comprising monitoring by the communication device for signals from other communication devices to detect other communication devices belonging to at least one group of paired communication devices, reporting the result of the monitoring to a control apparatus, receiving control instructions from the control apparatus, the instructions indicating a group that is different from any group detected by the monitoring, configuring the communication device based on the control instructions, and broadcasting information identifying the indicated group.

In accordance with another embodiment there is provided an apparatus for controlling communications, the apparatus comprising at least one processor, and at least one memory including computer program code, wherein the at least one memory and the computer program code are configured, with the at least one processor, to process information about groups of paired communication devices, said information being obtained based on detection by at least one communication device in a set of paired communication devices, and to cause grouping of sets of paired communication devices into groups of paired communication devices, wherein the grouping is based at least in part on said information about groups of paired communication devices.

In accordance with yet another embodiment there is provided an apparatus, comprising at least one processor, and at least one memory including computer program code, wherein the at least one memory and the computer program code are configured, with the at least one processor, to cause monitoring by a communication device for signals from other communication devices to detect other communication devices belonging to at least one group of paired communication devices, to cause reporting the result of the monitoring to an apparatus for controlling, to cause configuring of the communication device based on control instructions received from the apparatus for controlling, the control instructions indicating a group that is different from any group detected by the monitoring, and to cause broadcasting information identifying the indicated group.

In accordance with a more detailed embodiment radio recourses are allocated for communication devices in a group of paired communication devices by a control apparatus of a cellular communication system. Similar control can be applied to each set of paired communication devices in a group. Possibility of interference can be determined based on information about detection of groups of paired communication devices by communication devices.

At least one group of paired communication devices can be detected by at least one of the communication devices in the set of paired communication devices. The detection may comprise detection of identities of nearby groups of paired communication devices based on information signalled by communication devices in the nearby groups. Information identifying a group of paired communication devices can be broadcast. Each paired communication device in a relevant area may broadcast the information.

Information identifying a group of detected paired communication devices may be transmitted by each communication device in the set of paired communication devices.

In accordance with an embodiment a control apparatus of a cellular communication system controlling operation of communication devices within the operational area thereof can receive information detected by at least one cellular communication device and identifying at least one group of paired communication devices. Control may comprise allocation of resources to cellular communication devices and paired communication devices based at least in part on said reporting such that different resources are allocated to the cellular communication devices than to said paired communication devices.

Cell identity information may be communicated, in addition to information identifying a group of sets of paired communication devices, between the paired communication devices and/or cellular communication devices and a base station of the communication system.

Information about paired communication devices may be communicated between at least two control apparatus of the communication system.

A computer program comprising program code means adapted to perform the method may also be provided.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to wireless or mobile communication systems serving mobile communication devices. Before explaining in detail the certain exemplifying embodiments, certain general principles of a wireless communication system and wireless communication devices are briefly explained with reference to FIGS. 1 and 2 to assist in understanding the technology underlying the described examples.

A communication device can be used for accessing various services and/or applications provided via a communication system. In wireless or mobile communication systems the access is provided via a wireless access interface between mobile communication devices 1 and an appropriate access system 10. A mobile communication device 1 can typically access wirelessly a mobile network system via at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may communicate with more than one other station. In addition to communications with the base station, the communication devices can be in direct communication with the other communication devices.

Figure 1:
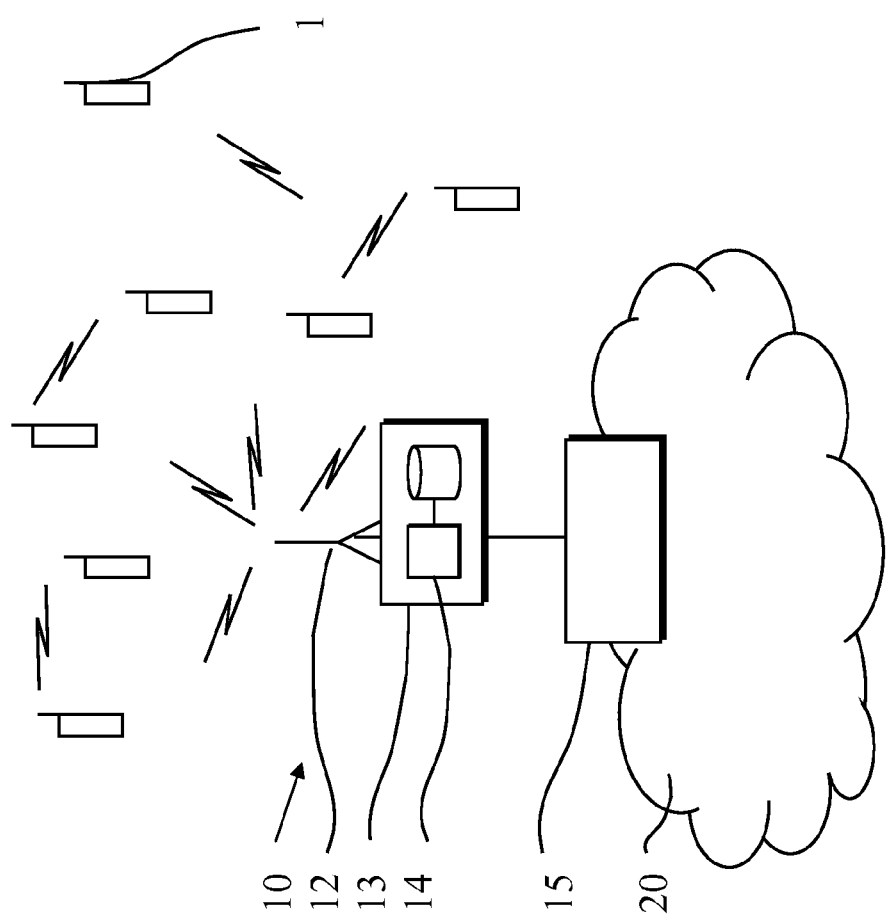
FIG. 1 shows an example of a communication system in which the embodiments of the invention may be implemented.

A base station is typically controlled by at least one appropriate control apparatus so as to enable operation thereof and management of mobile communication devices in communication with the base station. A control entity of a base station can be interconnected with other control entities. In FIG. 1 the control apparatus is shown to be provided by block 13. An appropriate controller apparatus may comprise at least one memory, at least one data processing unit and an input/output interface. The controller is thus typically provided with memory capacity and at least one data processor 14. It shall be understood that the control functions may be distributed between a plurality of controller units and/or that a part of the control may be provided by a control apparatus controlling a plurality of base stations. The controller apparatus for a base station may be configured to execute an appropriate software code to provide the control functions as explained below in more detail.

In the FIG. 1 example the base station node 12 of the access is connected to a wider communication network 20 via node 15. A communication system may be provided by one or more interconnect networks and the elements thereof, and one or more gateway nodes may be provided for interconnecting various networks.

A communication device can be provided with wireless access to the communication system based on various access techniques, such as code division multiple access (CDMA), wide-band CDMA (WCDMA), time division multiple access (TDMA), frequency division multiple access (FDMA), Orthogonal Frequency-Division Multiple Access (OFDMA), space division multiple access (SDMA), and so on.

A non-limiting example of mobile architectures where the herein described principles may be applied is known as the Evolved Universal Terrestrial Radio Access Network (E-UTRAN). Non-limiting examples of appropriate access nodes are a base station of a cellular system, for example a base station known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
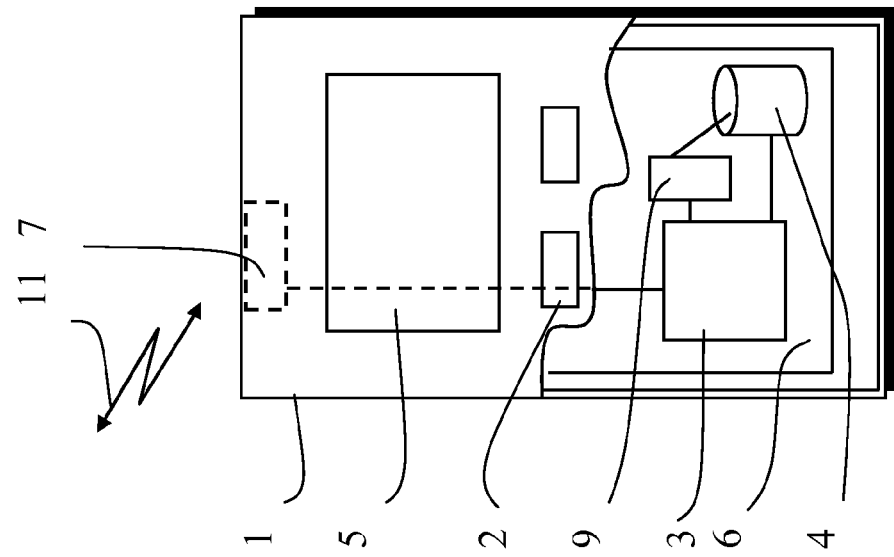
FIG. 2 shows an example of a communication device.

FIG. 2 shows a schematic, partially sectioned view of a communication device 1 that can be used for communication with the base station 12 and also for communication with other mobile communications devices. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. The mobile communication device 1 may be used for voice and video calls, for accessing service applications provided via a data network and so forth. The mobile communication device 1 may receive signals via appropriate apparatus for receiving and transmitting radio signals on wireless carriers, or radio bearers. In FIG. 2 a transceiver apparatus is designated schematically by block 7. The transceiver apparatus may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Direct mobile cellular device-to-device (D2D) communications, or D2D for short in the following, can also be provided between the communication devices 1 in the system of FIG. 1. In direct mobile cellular device-to-device communications two or more of the devices can be paired into a set of paired communication devices where after a communications link between the members of the set can be established. It is noted that direct communications between devices can be referred to in various terms, for example as mobile-to-mobile (M2M), machine-to-machine (M2M), terminal-to-terminal (T2T) or peer-to-peer (P2P).

Mobile cellular device-to-device (D2D) communications can use licensed radio spectrum under supervision and control of at least one supporting system, typically a cellular system. D2D may use, at least for a part of the needed resources, the same radio resources of the supporting system or systems. Direct D2D communications can be incorporated into the cellular network for example to reduce transmitter power consumption in the participating communication devices and the network side, to improve spectrum efficiency, to increase cellular network capacity and coverage, and to create and support more services for users in an efficient fashion. Direct D2D communications in a cellular system may potentially achieve improved spectrum efficiency by spatial reuse. That is, certain radio resources may be simultaneously reused among different D2D users and/or D2D users and cellular users. However, interference between the various users should be limited. Contention based resource allocation, which is usually used in ad-hoc/distributed networks, can achieve the spatial reuse naturally with resource contention. However, the contention based resource allocation mechanism does not necessarily guarantee a delay bound and can behave poorly under heavy load conditions. This can result excessive delays, throughput degradation and packet loss because of excessive collisions. Therefore, designing D2D users to share radio resources in contention way may not always meet the anticipated requirements for D2D such as enhancing efficiency for cellular systems in terms of resource utilization, network performance, service quality and cost.

Figure 3:
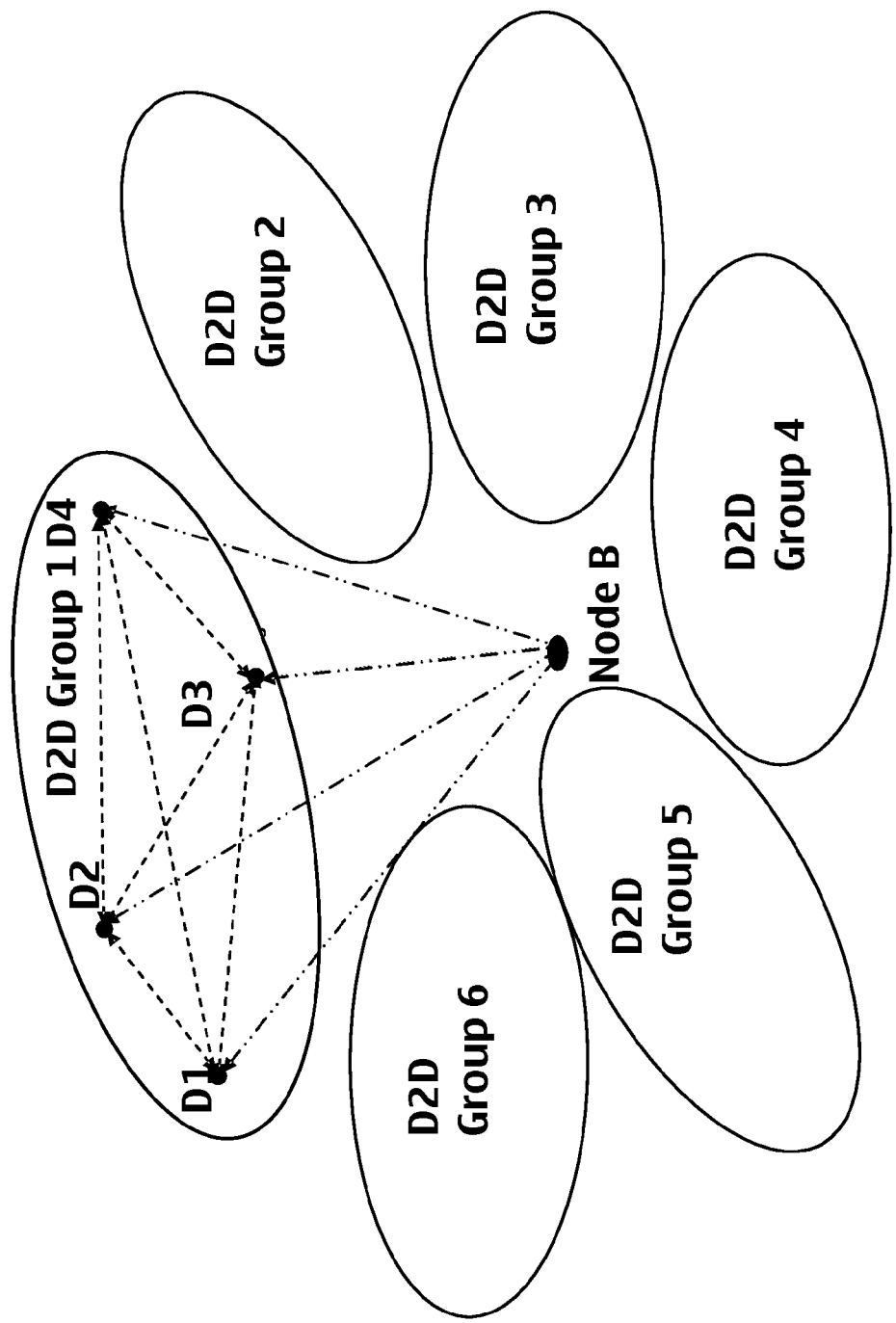
FIG. 3 shows an example for grouping of communication devices.

The paired communication devices can be grouped to lessen the burden on the central node. An example of grouping of devices for D2D communication with spatial reuse in the area of a cell is illustrated in FIG. 3. Each of the groups can be provided with an identity. A central control, for example a base station such as the enhanced NodeB (eNB) of FIG. 3 in cellular network, can be responsible for controlling/scheduling resource allocation for the paired communication devices together with cellular communication devices, i.e. devices communicating via a base station of a cellular system. The central node can also assign and manage the group identities. To improve the efficiency of such centrally controlled resource allocation mode, certain local environment awareness may be needed by the central control entity. Due to the distributed and local behaviour of D2D communications, however, collecting and maintaining such local environment information for each D2D communication pair can require a considerable control and signalling overhead. The following describes a smart grouping method and control and signalling mechanism that can be used to facilitate resource allocation in D2D integrated cellular system and addressing the overhead issue.

Grouping can be utilised to lessen the burden of signalling caused by the sets of paired communication devices. In the example of FIG. 3 six D2D groups are provided. Groups 1 and 4 may use same subset of Physical Resource Blocks (PRBs). Groups 2 and 5 may use same subset of PRBs, but different from the ones used by groups 1 and 4. Likewise, groups 3 and 6 may use same subset of PRBs, but different from the ones used by the other groups in the cell. In FIG. 3 grouping of D2D devices is based on the closeness of the devices, i.e. devices in close vicinity to each other are grouped together and the spatial reuse is done on the group level. Within each group, another level of resource allocation and corresponding control is used to allow the D2D users to share the resources within the group. Although this is considered as being suitable for cluster based multicast services, for a direct D2D communication such a two level resource allocation mechanism can become quite complicated. This may be the case in particular if interference among multiple D2D communication pairs close with each other and grouped together should also be managed.

In the below described embodiments the grouping is based on a different approach. Instead of grouping sets of paired devices based on the closeness thereof, sets of paired communication devices can be grouped by taking possible or real interference into account. For example, sets formed by paired devices can be determined to be geographically located so that the interference between the sets can be considered as negligible even if the different sets are using the same radio resources (e.g. due to service context similarity). This can be based on detection of nearby communication devices or sets by one or more communication devices. For example, if a communication device associated with a set detects another set of paired communication devices, it can be assumed that the other set may cause interference. On the other hand, such active sets and/or groups that are not detected are not likely to cause any noticeable interference. Thus a group of paired devices that was not detected by a relevant device can be selected. This can be used to improve the efficiency of a centralised resource control as awareness of local environment and/or conditions can be taken into account in forming of the groups.

Figure 4:
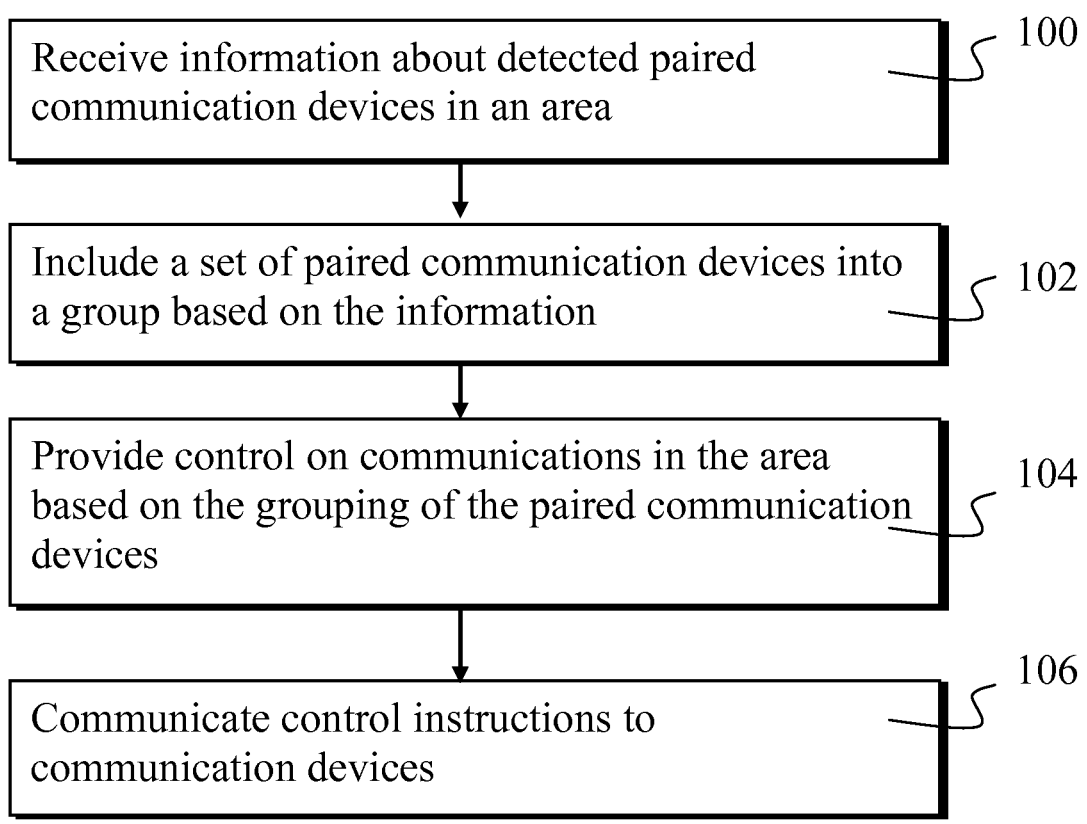
FIGS. 4 and 5 are flowcharts illustrating certain embodiments.

An example for a method where grouping is provided by a control apparatus of a node in a cellular network such that interference is taken into account is illustrated by FIG. 4. The control apparatus can be, for example, a controller of a base station or a controller of a radio network. The control apparatus can receive at 100 information about existing groups and/or devices in direct wireless communication with each other. The information can be provided by at least one communication device located within its service area and capable of detecting existence of a group and/or sets of devices in direct wireless communication. For example, the control apparatus can receive reports from communication devices that are to setup a direct communication connection and that have detected other paired devices. Sets of paired communication devices are then grouped at 102 into groups of paired communication devices at least in part based on the received information indicative of potential and/or real interference by paired communication devices.

A report that no groups have been detected can also be taken into account. In this case the communication device can, for example, report an empty detected group list. The control apparatus can then select an appropriate group based on another group selection criteria, for example based on interference between the paired communication devices and cellular devices in the area and/or the ongoing and requested services among the sets of the paired communication devices.

The control apparatus can execute an appropriate grouping algorithm to make a decision on grouping to optimise interference within a group and/or within its service area based on information received from one or more of the communication devices in its service area. The control apparatus may also utilise information, for example information about local conditions, stored in a memory thereof in the grouping.

Control on wireless communications in the service area can then be provided at 104 based on the grouping. For example, similar control instructions can be sent to each set of paired communication devices in a group at 106. The control can comprise central allocation of radio recourses for communications between the communication devices in at least one of the groups and/or cellular communication devices by the control apparatus.

Figure 5:
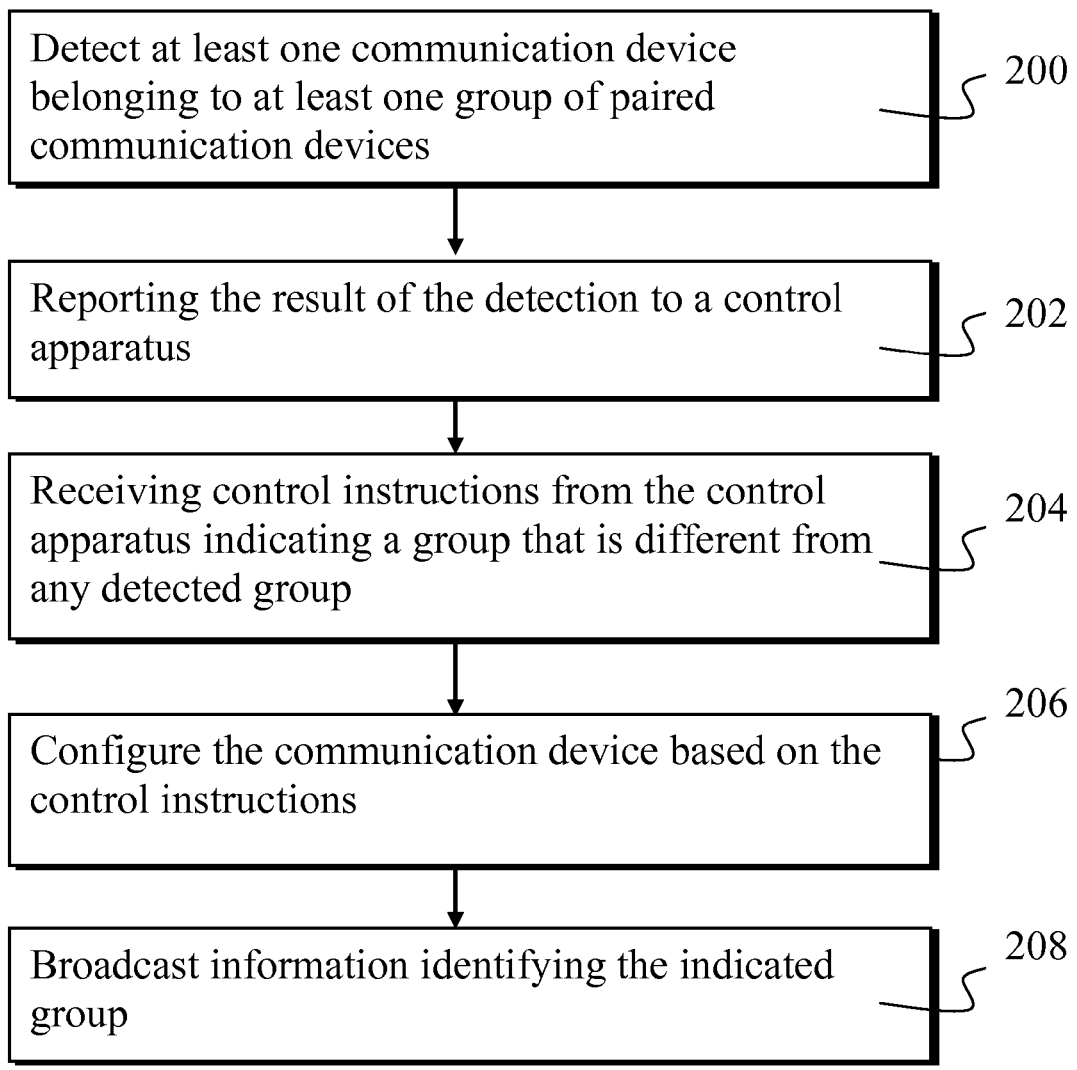

FIG. 5 shows an example for operation at a communication device, for example to initiate forming of a set of paired communication devices. The communication device is monitoring for signals from other communication devices and can detect at 200 that there are other communication devices belonging to at least one group of paired communication devices in its neighbourhood. The communication device can report the results of the monitoring at 202 to the control apparatus at the network. If no groups are detected, this can also be reported. At this stage the steps 100 to 106 of FIG. 4 can be performed by the control apparatus.

The communication device can then receive control instructions from the control apparatus at 204. The instructions indicate a group that is different from any group that has been detected by the monitoring. The communication device can then be configured at 206 based on the control instructions for the group. At 208 the communication device can broadcast information identifying the indicated group so that other devices can detect the existence of the group.

Figure 6:
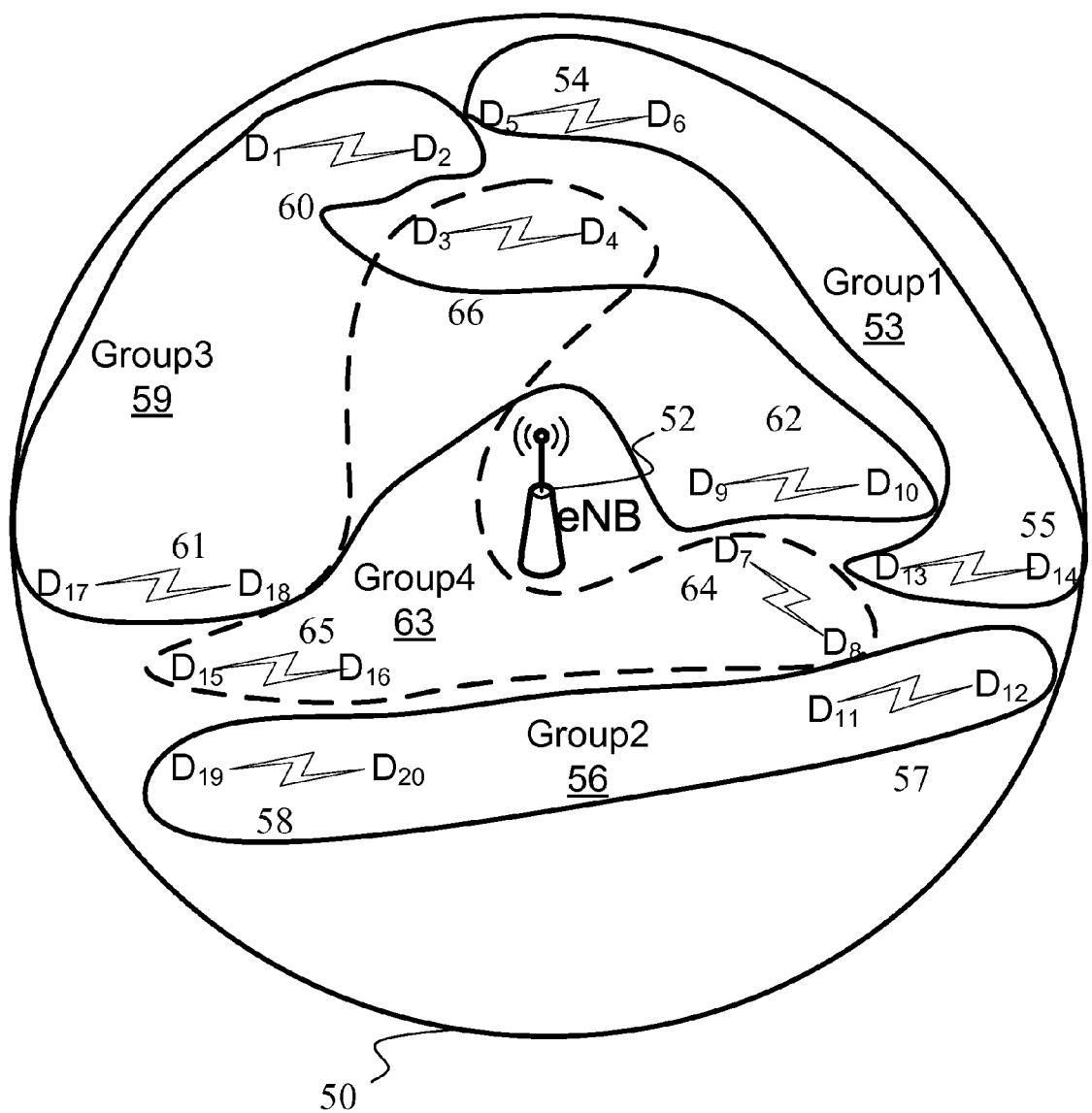
FIG. 6 shows an example for grouping in accordance with an embodiment.

An example of a possible grouping that can result is illustrated in FIG. 6. In FIG. 6 a cell 50 is provided and controlled by eNB 52. Four groups 53 (Group 1), 56 (Group 2), (Group 3) and 63 (Group 4) are formed such that Group 1 comprises two sets of paired communication devices 54 (D5, D6) and 55 (D13, D14); Group 2 comprises two sets of paired communication devices 57 (D11, D12) and 58 (D19, D20); Group 3 comprises three sets of paired communication devices 60 (D1, D2), 61 (D17, D18) and 62 (D9, D10); and Group 4 comprises three sets of paired communication devices 64 (D7, D8), 65 (D15, D16) and 66 (D3, D4).

In the resulting grouping the sets of paired communication devices of each group are located such that an interference mitigating minimum distance is provided between the closest devices of the sets in a group. The distance is such that the devices of a pair in a group cause only negligible, or no, interference to the other pair or pairs in the group. It is noted, however, that although distance between the sets is a good example for illustrative purposes in practice it may not be easy for communication devices and a central control node to know or estimate the actual distance between the communication devices. This is addressed here by providing the grouping such that interference in the cell is taken into account based on the reports from the communication devices. In a report a device reports groups it has detected in its neighbourhood and the control node then assigns a different group for the device. Similar control can then be applied to the sets of paired devices in the group as they can be assumed to be located such that they do not interfere each other.

In addition to detection by the communication devices the grouping can nevertheless take various other factors into account. For example, at least two sets of paired communication devices can be determined as being geographically far enough from each other or otherwise so located that it can be assumed that the sets will not interfere each other, and can be placed in a control group. Other factors indicative of possible interference and/or absence of interference may also be taken into account. For example, it can be known for the control node that there is a structure, for example a wall or other obstruction, in the cell area that absorbs interference. The control apparatus of the node can have been programmed to assume that two sets of paired devices on different sides of the obstruction do not cause excessive interference to each other even if they are located relatively close to each other. On the other hand, as interference control can be embedded into the grouping concept that is based on detection by communication devices, variations in the level of interference caused by the other paired devices in a cell can be taken into account solely based on information of groups that have been reported as having been detected. Thus the control apparatus can determine possible interference among the devices and determine groups accordingly even without any knowledge of the particular conditions in the cell.

Figure 7:
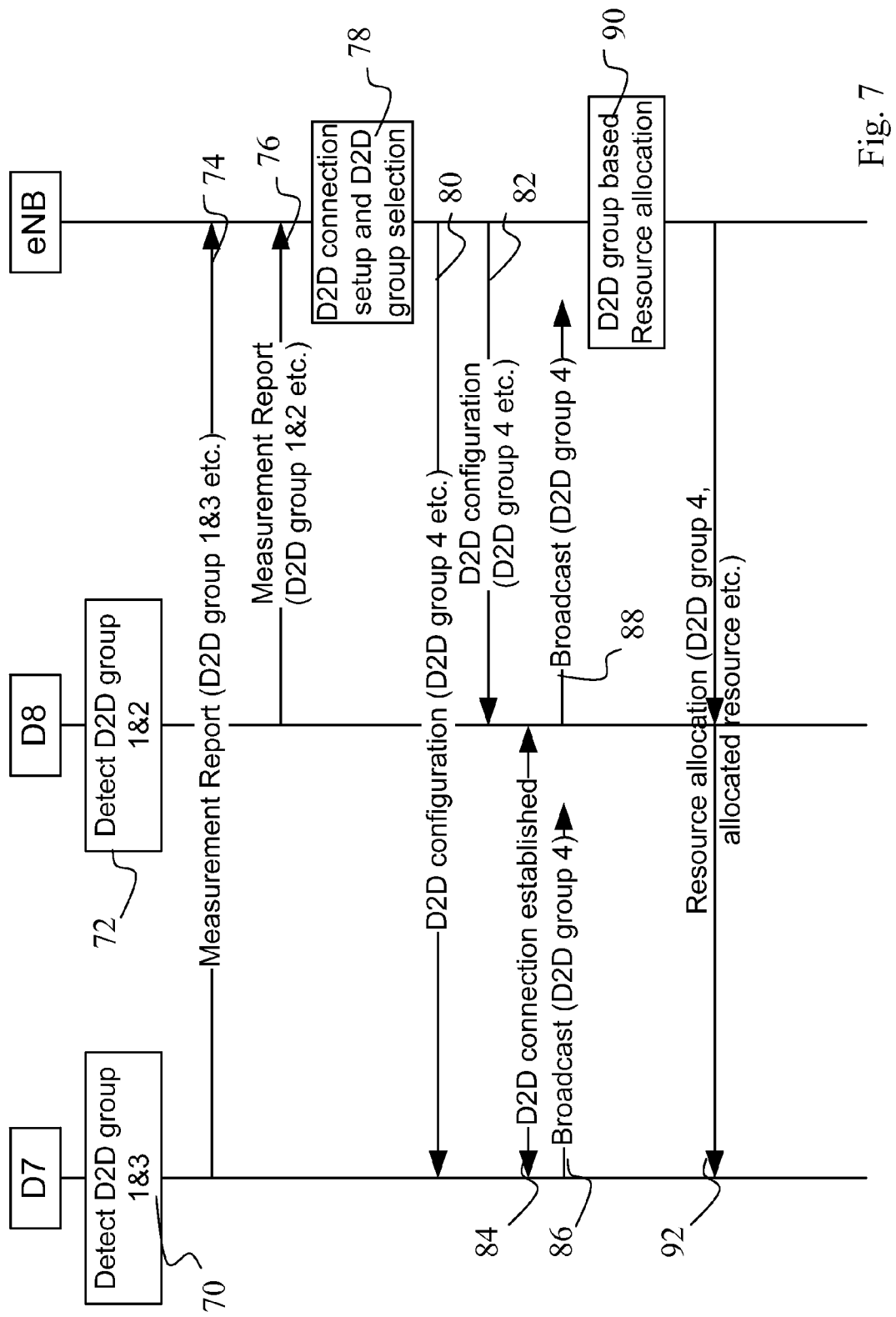
FIG. 7 shows a signalling flow for an embodiment.

The following explains more detailed examples for embodiments where D2D groups are managed and resource allocation controlled based on reports from communication devices with reference to 3GPP LTE-A Release 10 and beyond systems. One possible implementation on D2D group management/control and group based resource allocation in a LTE system is illustrated by the signalling flowchart of FIG. 7 which is based on the groupings of FIG. 6. FIG. 7 shows the signalling between the eNB 52 and the D2D communication pair 64 of FIG. 6 (devices D7 and D8) for setting up a direct communications link between the devices.

Each of the devices D7 and D8 can detect at 70, 72 existence of nearby groups, and more particularly other devices broadcasting a group identity. In the example D7 detects Groups 1 and 3 and D8 detects Groups 1 and 2. The detection can be triggered by a communication device. For example, the detection can be provided before the device is going to setup direct D2D communication with another device. The detection may also be triggered by the network/ the control node. For example, the eNB can send a trigger by means of a measurement control procedure. The detection can be based, for example, on detected synchronization/ beacon/sounding sequences that the other D2D devices send. The group identities can be linked with synchronization/beacon/sounding sequences and corresponding channel locations in term of frequency and time in case of implicit group identity indication. The detection can also be based on explicit group identity that is broadcasted by other D2D pairs. In latter case, the D2D device pair in question may need to receive and decode the broadcasted messages from all the D2D devices in the neighbourhood.

Each of the devices D7, D8 can then send a measurement report 74, 76 to the control node eNB including information identifying the detected groups. For example, each of the devices can indicate identities of the detected groups in a cellular measurement report over an air interface.

The D2D devices D7, D8 can be connected with a cellular system using an ordinary cellular mode. Therefore, the control and reporting can be done using normal cellular procedures. For example, in a 3GPP cellular system, a communication device can have a dedicated control channel to/from a control node, such as NodeB, eNB, radio network controller (RNC) or base station controller (BSC) for control and reporting purposes.

In a cellular integrated D2D communication system a communication device can have a cellular connection with a certain base station or eNB before it is going to setup D2D communications. Thus the communication device can send its reports to this base station. However, a procedure may be provided for selecting and connecting a control node whereto communicate the report, for example on the basis of a cell selection procedure or another appropriate central controller selection procedure.

The communication devices may also report other information, such as the interference status from the cellular network, service parameters for D2D communication request, status/profile information such as its velocity and/or direction and so on.

Upon receipt of the measurement reports the eNB can provide connection set-up and group selection procedure at 78. The eNB can send configuration information messages 80, 82 to the communication devices D7 and D8 in accordance with the configuration of Group 4 devices. The signalling can indicate the group the devices are to be configured to belong to. For example, a dedicated control channel can be used in cellular systems to configure devices D7 and D8 for a D2D connection setup.

The communication devices can then setup the direct D2D convection based on signalling 84 there between. The devices can also broadcast the group identity of Group 4 accordingly, as shown by broadcast signalling 86 and 88. The eNB can then allocate at 90 resources for the devices belonging to Group 4. A single resource allocation signalling message 92 can be sent based on the knowledge that the devices belong to Group 4.

For implicit indication of a group, the group identity information can be linked with certain sequence(s) which are used in e.g. synchronization, beacon or sounding channels and may be separated in time and frequency domain as well. The mapping between group identities and the synchronization/beacon/sounding channels can be controlled by the control apparatus at the cellular network side and may be configured to paired communication devices via common or dedicated signalling. For explicit indication, the group identity information can be included for example into an advertising message (e.g. beacon message) that D2D devices can broadcast. The broadcasting may be needed in order to facilitate D2D connection setup. The devices may need to broadcast certain further information, for example an identity of the device to make other devices to be aware of the availability of the device to facilitate D2D operation control.

In accordance with an embodiment every D2D device in each D2D group may indicate the group identity to avoid "hidden device" problem. The indication may be sent on different occasions.

As shown in FIG. 7, the devices may detect only partly overlapping groups and/or different groups. It may thus be desired that all devices report their detections to ensure that all relevant groups are taken into account. The control can also be based on D2D group identities that are detected and reported by only one or not all devices in a set of D2D devices. A central control entity can then provide coordination, selection and configuration of one of the free D2D groups for the D2D devices in question based on at least in part this information.

Efficient and effective allocation of resources for D2D communication and normal cellular mode communication can involve various actions. For example, a central control node, for example the eNB, can allocate D2D resources on basis of D2D group either semi-statically or dynamically. All D2D device pairs in a D2D group can be allocated the same resource for D2D communications with a single resource allocation signalling message 92 or other control action to reduce signalling overhead. The D2D group identity and the allocated resource can be indicated in resource allocation signalling.

Signalling of allocation of communication resources may not necessarily be enough in all circumstances and further information or rules may be required for enabling direct D2D communication. The control apparatus may thus need to inform the communication devices whose turn it is to transmit and receive on the allocated resources, when and how. For example, an indication "who receive/transmit" can be added in the resource allocation message 92. According to a possibility the eNB only allocates the resources and the D2D devices in each pair then decide by themselves "who transmit/receive" on the allocated resources. In accordance with an embodiment the transmitting and sending devices of the set of D2D devices may be assigned and indicated in a certain common format. In accordance with a possibility the set of D2D devices can coordinate the resource partition for transmission and reception between them based on e.g. a pre-defined transmit/receive (Tx/Rx) switch point. A pre-defined Tx/Rx switch point can be configured to the D2D devices for example if the direct D2D communication is based on time division duplexing (TDD) mode. Based on such switch point, D2D devices can determine when to transmit/receive on the allocated resources.

In addition or instead of the paired communication devices, cellular communication devices within the relevant area can detect D2D groups and report detected D2D group identities to a central control node of a cellular network. Resource allocation algorithm in the control node of the cellular network can take the report into account in resource allocation to avoid allocating the same resource to cellular communication devices and D2D devices who are nearby each other and may thus interfere with each other.

In accordance with a further embodiment for D2D communications in multi-cell and multi-central-control-entities scenarios in which D2D devices communicating with each other in direct D2D mode may reside in different cells or under control of different eNBs, the cell identity, in addition to the D2D group identity, may be indicated by at least one of the D2D devices. The cell identity may be detected and reported by D2D users and cellular users in the neighbourhood. This can be used to extend the central control from cell level to cover multiple of cells. In order to extend the D2D communications over multiple of cells the cell identity information, in addition to the D2D group identity, may be needed by control apparatus of the network in order to select an optimal group taking into account multi-cell conditions for the devices to join.

In accordance with an embodiment, information, e.g. the detected D2D group identities of the neighbouring cell, the allocated resources for each D2D group and so forth, may be exchanged over the interface between the involved cellular central control entities, e.g. X2 interface in LTE, to coordinate the selection of the D2D group for certain D2D communication pair and resource allocation for certain D2D group in multi-cell environment.

The required data processing apparatus and functions of a base station apparatus as well as appropriate communication devices may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor-based memory devices, magnetic memory devices and systems, optical memory devices and systems, fixed memory and removable memory.

An appropriately adapted computer program code product or products may be used for implementing the embodiments, when loaded on an appropriate data processing apparatus, for example for determining group identities and/or for group selection and/ore resource allocation and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

In the above described embodiments local environment awareness for resource allocation in a cell where paired communication devices are in direct communication can be embedded in the direct communication group concept. The measurement effort and the reporting signalling required for resource allocation and spatial reuse can be optimised. In addition, a group based resource allocation mechanism can be used to enable allocation of resources/scheduling for multiple communication pairs with a command message to save signalling overhead.

In the above described embodiment grouping is controlled on the network side. In accordance with a possibility a communication device can suggest an appropriate group based on detected groups in the neighbourhood. The final decision/control can remain in the network side in order to efficiently manage the interference and resources on at least cell level. However, it is also possible that the communication device may make the decision, for example due to lack of a response from a control node within a predefined time.

The communication device pairs in the neighbourhood that may interfere with each other if same resources are used are not configured to join the same group. Thus resource coordination and corresponding control within one group is not necessarily needed. This can also be utilised to reduce the control and signalling overhead among users in one or different groups.

It is noted that whilst embodiments have been described in relation to LTE-Advanced, similar principles can be applied to any other communication system where direct communications between communication devices can occur. For example, this may be the case in applications where no fixed control equipment is provided but a communication system is provided by means of a plurality of mobile user equipment, for example in adhoc networks, and at least one of the user equipments can provide control on the communications based on grouping that takes interference into account. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
   receiving information in a wireless communication system relating to communication devices in at least one other set of paired communication devices from a communication device in the set of paired communication devices, the information being determined based on detection by the communication device;
   grouping the set of paired communication devices with the at least one other set of paired communication devices at least in part based on information about other paired communication devices, into a group,
      such that the communication devices in the sets are not detecting each other, and
      where, in a resulting grouping, the sets of paired communication devices of each group are located such that an interference mitigating minimum distance is provided between closest devices of the sets in a group;
   allocating radio resources to the group of sets of paired communication devices so that the radio resources may be simultaneously reused between the sets of paired communication devices; and
   sending control instructions to at least one communication device in the set, the control instructions comprising the allocated radio resources.

2. The method of claim 1, further comprising sending the control instructions to the communication devices in each set of paired communication devices in the group.

3. The method of claim 1, wherein the grouping is determined by taking possible or real interference into account.

4. The method of claim 1, further comprising:
receiving from at least one communication device information identifying groups of paired communication devices in an area; and
configuring the group of paired communication devices for the set of paired communication devices based on the received information.

5. The method of claim 1, wherein the control instructions comprise an identity of the group.

6. The method of claim 5, wherein the control instructions comprise information about the use of the resources within the set of paired communication devices.

7. The method of claim 1, wherein a control apparatus of a cellular communication system controls the operation of communication devices within the operational area thereof, the method comprising receiving information identifying at least one group of paired communication devices at the control apparatus of the cellular communication system, the information being based on detection by at least one cellular communication device connected to the cellular system.

8. The method of claim 7, wherein the controlling further comprises allocating resources to cellular communication devices and paired communication devices based at least in part on said reporting such that different resources are allocated to the cellular communication devices than to said paired communication devices.

9. The method of claim 1, comprising signaling information about the paired communication devices b to another control apparatus of the communication system.

10. A computer program product embodied on a non-transitory computer-readable medium comprising program code configured to perform the steps of claim 1 when the program is run on a data processing apparatus.

11. A method comprising:
monitoring by a communication device in a set of paired communication devices for signals from other communication devices;
detecting other communication based on the monitoring;
reporting the detected communication devices to a control apparatus;
receiving control instructions from the control apparatus, wherein the control instructions comprise radio resources allocated for the communication device, and
wherein the radio resources are determined based on the reported detected communication devices, and
wherein the reported detected communications devices in a neighborhood of the control apparatus are located such that they do not interfere with the set of paired communication devices so the control apparatus can apply similar control instructions to other sets of paired devices in the neighborhood.

12. The method of claim 11, wherein the detecting further comprises detecting at least one of synchronization, beacon and sounding sequences.

13. The method of claim 11, wherein the detecting further comprises detecting identities of nearby groups of paired communication devices based on information signalled by communication devices in the nearby groups.

14. The method of claim 11, wherein the reporting further comprises reporting information identifying a detected group of paired communication devices by each communication device in the set of paired communication devices.

15. The method of claim 11, further comprising broadcasting information identifying a group of paired communication devices.

16. The method of claim 15, comprising broadcasting information identifying a group of paired communication devices by each paired communication device in the relevant area.

17. The method of claim 15, wherein the broadcasting comprises transmitting the information identifying the group in a predefined sequence of bits in different frequency and time resources.

18. The method of claim 11, further comprising receiving information regarding a mapping between sequences of bits in different frequency and time resources and group identities from a control apparatus of the communication system.

19. The method of claim 11, wherein reporting further comprises reporting cell identity information.

20. An apparatus, comprising at least one processor, and at least one memory including computer program code, wherein the at least one memory and the computer program code are configured, with the at least one processor, to cause or control:
receiving information in a wireless communication system relating to communication devices in at least one other set of paired communication devices from a communication device in the set of paired communication devices, the information being determined based on detection by the communication device;
grouping the set of paired communication devices with the at least one other set of paired communication devices at least in part based on information about other paired communication devices, into a group,
such that the communication devices in the sets are not detecting each other, and
where, in a resulting grouping, the sets of paired communication devices of each group are located such that an interference mitigating minimum distance is provided between closest devices of the sets in a group;
allocating radio resources to the group of sets of paired communication devices so that the radio resources may be simultaneously reused between the sets of paired communication devices; and
sending control instructions to at least one communication device in the set, the control instructions comprising the allocated radio resources.

21. The apparatus of claim 20, wherein the at least one memory and the computer program code are further configured, with the at least one processor, to cause or control sending the control instructions to the communication devices in each set of paired communication devices in the group.

22. The apparatus of claim 20, wherein the grouping is determined by taking possible or real interference into account.

23. The apparatus of claim 20, wherein the detecting further comprises detecting at least one of synchronization, beacon and sounding sequences.

24. The apparatus of claim 20, wherein the control instructions comprise an identity of the group.

25. The apparatus of claim 20, wherein the at least one memory and the computer program code are further configured, with the at least one processor, to cause or control controlling the operation of communication devices within the operational area thereof, the control apparatus being configured to process information identifying at least one group of paired communication devices that is based on detection by at least one cellular communication device.

26. The apparatus of claim 25, wherein the at least one memory and the computer program code are further configured, with the at least one processor, to cause or control allocating resources to cellular communication devices and paired communication devices based at least in part on said processing such that different resources are allocated to the cellular communication devices than to the paired communication devices.

27. The apparatus of claim 20, wherein the at least one memory and the computer program code are further configured, with the at least one processor, to cause or control signalling of information about the paired communication devices b to another control apparatus of the communication system.

28. A base station comprising the apparatus in accordance with claim 20.

29. A communication system comprising the apparatus as claimed in claim 20.

30. An apparatus, comprising at least one processor, and at least one memory including computer program code, wherein the at least one memory and the computer program code are configured, with the at least one processor, to cause or control:

monitoring by a communication device in a set of paired communication devices for signals from other communication detecting other communication devices based on the monitoring;

reporting the detected communication devices to an apparatus for controlling, reporting the detected communication devices to a control apparatus;

receiving control instructions from the control apparatus, wherein the control instructions comprise radio resources allocated for the communication device, wherein the radio resources are determined based on the reported detected communication devices, and wherein the reported detected communications devices in a neighborhood of the control apparatus are located such that they do not interfere with the set of paired communication devices so the control apparatus can apply similar control instructions to other sets of paired devices in the neighborhood.

31. The apparatus of claim 30, wherein the at least one memory and the computer program code are further configured, with the at least one processor, to cause or control broadcasting of information identifying a group it is configured to belong to.

32. A mobile communication device comprising the apparatus in accordance with claim 30.

* * * * *